(12) United States Patent
Matsumoto

(10) Patent No.: US 8,376,122 B2
(45) Date of Patent: Feb. 19, 2013

(54) STOP DEVICE

(75) Inventor: Bungo Matsumoto, Shinagawa-ku (JP)

(73) Assignee: Hirata Corporation, Tokyo (JP)

( * ) Notice: Subject to any disclaimer, the term of this patent is extended or adjusted under 35 U.S.C. 154(b) by 0 days.

(21) Appl. No.: 13/467,895

(22) Filed: May 9, 2012

(65) Prior Publication Data

US 2012/0217135 A1    Aug. 30, 2012

Related U.S. Application Data

(63) Continuation of application No. PCT/JP2010/006084, filed on Oct. 13, 2010.

(30) Foreign Application Priority Data

Nov. 10, 2009   (JP) .................................. 2009-257542

(51) Int. Cl.
   *B65G 47/88* (2006.01)
(52) U.S. Cl. .................... 198/463.4; 193/35 A
(58) Field of Classification Search ............... 198/345.1, 198/345.3, 459.6, 459.7, 463.4; 193/35 A, 193/40
   See application file for complete search history.

(56) References Cited

U.S. PATENT DOCUMENTS

| | | | | |
|---|---|---|---|---|
| 5,211,276 A | * | 5/1993 | Clopton | 198/345.3 |
| 5,676,235 A | * | 10/1997 | Sam et al. | 198/345.3 |
| 5,860,505 A | * | 1/1999 | Metzger | 198/463.4 |
| 6,164,430 A | | 12/2000 | Nishimura | |
| 7,111,721 B1 | * | 9/2006 | Turner | 198/345.3 |
| 7,249,666 B1 | * | 7/2007 | Robinson | 193/35 A |
| 7,484,615 B2 | * | 2/2009 | Miyamoto | 198/345.1 |
| 7,559,419 B2 | * | 7/2009 | Unterhuber | 198/345.3 |
| 7,975,825 B2 | * | 7/2011 | Lindemann et al. | 193/35 A |

FOREIGN PATENT DOCUMENTS

| | | |
|---|---|---|
| JP | 3-125728 U | 12/1991 |
| JP | 3-288718 A | 12/1991 |
| JP | 6-016233 A | 1/1994 |
| JP | 8-319023 A | 12/1996 |
| JP | 11-227937 A | 8/1999 |

OTHER PUBLICATIONS

International Search Report (PCT/ISA/210) issued on Jan. 25, 2011, by the Japanese Patent Office as the International Searching Authority for International Application No. PCT/JP2010/006084.
Written Opinion (PCT/ISA/237) issued on Jan. 25, 2011, by the Japanese Patent Office as the International Searching Authority for International Application No. PCT/JP2010/006084.

* cited by examiner

*Primary Examiner* — Mark A Deuble
(74) *Attorney, Agent, or Firm* — Buchanan Ingersoll & Rooney PC

(57) ABSTRACT

This invention relates to a stop device including a swinging unit which includes a workpiece abutment portion which stops a workpiece being conveyed by abutting against the workpiece, and is pivotal between an abutment position and a retraction position, an elastic member for the swinging unit which gives a biasing force to the swinging unit, an electromotive drive unit including a movable portion and a driving portion, and a pivot restricting member which performs pivot restriction of the swinging unit by moving to engage with the swinging unit in response to movement of the movable portion and releases the pivot restriction.

7 Claims, 5 Drawing Sheets

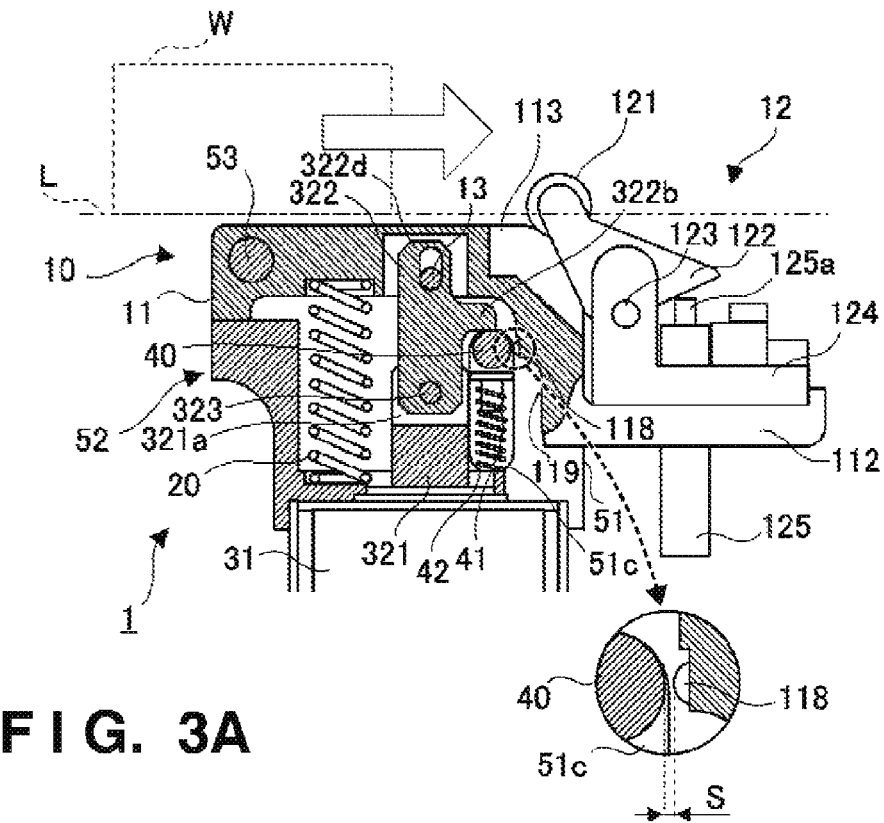
F I G. 3A
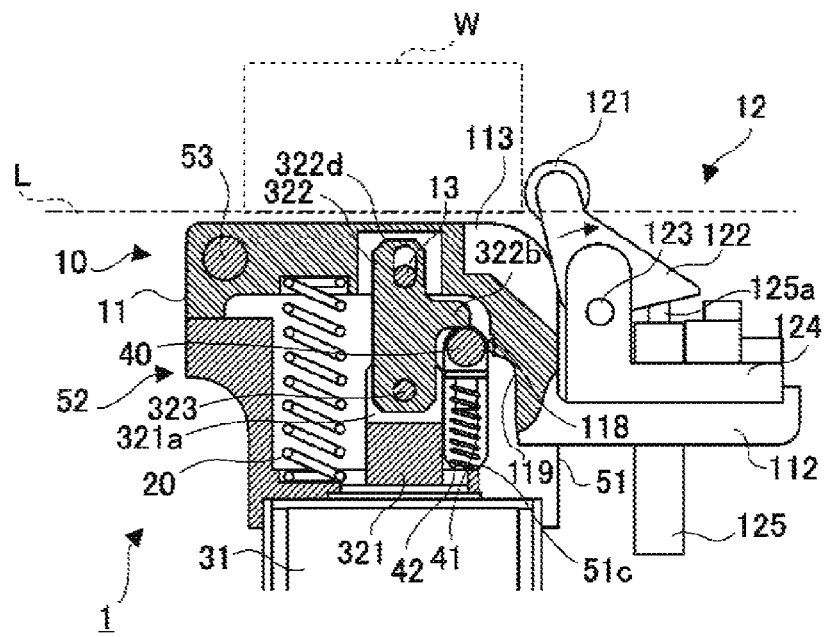
F I G. 3B

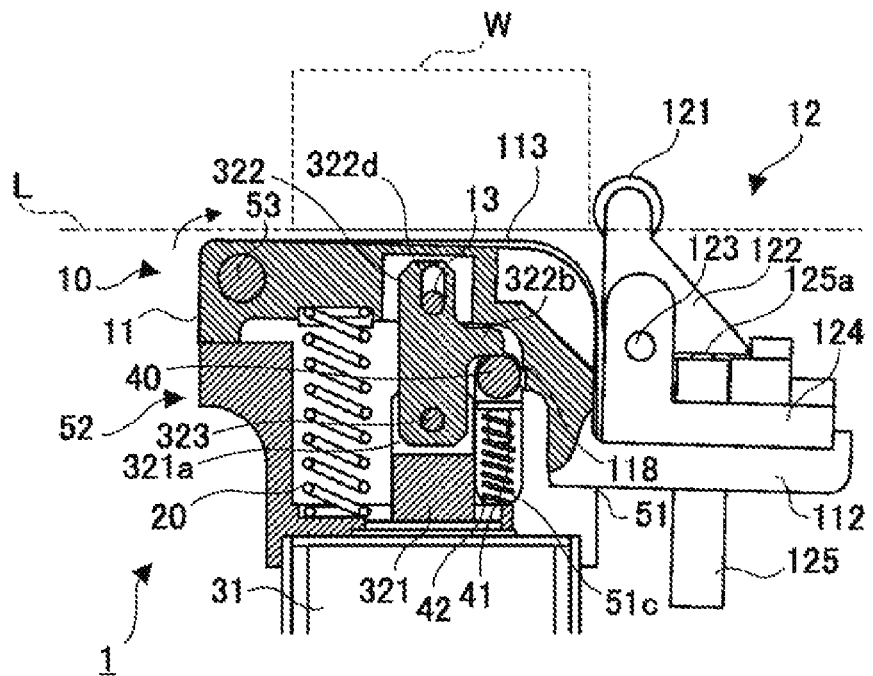
F I G. 4A
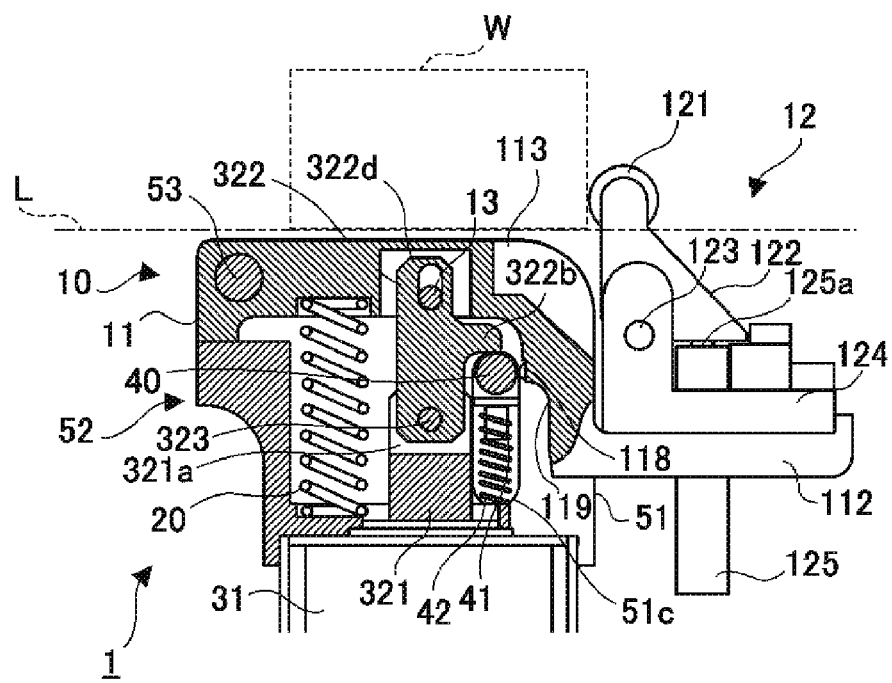
F I G. 4B

STOP DEVICE

BACKGROUND OF THE INVENTION

1. Field of the Invention

The present invention relates to a stop device which stops a workpiece being conveyed by abutting against it.

2. Description of the Related Art

A stop device is known which stops a workpiece conveyed on a conveyance device such as a roller conveyor at a predetermined position. The stop device stops a workpiece or releases the stopped workpiece by advancing or retracting an abutment portion such as a roller abutting against the workpiece on or from a conveyance device. The stop device therefore requires a mechanism or actuator which reciprocates the abutment portion. As an actuator for the stop device, an air cylinder capable of generating driving forces in two directions is often used because the abutment portion needs to be reciprocated (patent literatures 1 to 3).

CITATION LIST

Patent Literature

PTL1: Japanese Patent Laid-Open No. 6-16233
PTL2: Japanese Patent Laid-Open No. 8-319023
PTL3: Japanese Patent Laid-Open No. 11-227937

SUMMARY OF THE INVENTION

Technical Problem

To use an air cylinder, however, the device requires an air supply system. In order to motorize conveyance equipment without an air supply system, it is necessary to use an electric actuator in place of an air cylinder. As an electric actuator, an actuator such as a solenoid is less expensive than a motor or the like, and allows the cost of the conveyance equipment to be reduced.

However, a solenoid or the like is designed to generate a driving force in a single direction. A stop device needs to maintain the advanced state and retracted state of an abutment portion which abuts against a workpiece as well as to advance and retract the abutment portion. When using a solenoid or the like, therefore, the device needs to satisfy these requirements by using a driving force in a single direction.

It is an object of the present invention to implement a function required for a stop device by using an electric actuator which generates a driving force only in a single direction.

Solution to Problem

According to the present invention, there is provided a stop device which stops a workpiece being conveyed by abutting against the workpiece, comprising a swinging unit which includes a workpiece abutment portion which stops the workpiece being conveyed by abutting against the workpiece, and is pivotal between an abutment position at which the workpiece abutment portion protrudes to a level higher than a lower surface of the workpiece and abuts against the workpiece and a retraction position at which the workpiece abutment portion retracts to a level lower than the lower surface of the workpiece and the workpiece is not in contact with the workpiece abutment portion, an elastic member for said swinging unit which gives a biasing force to the swinging unit in a direction to locate the swinging unit at the abutment position, an electromotive drive unit including a movable portion which is coupled to the swinging unit and a driving portion which moves the movable portion in a direction in which the swinging unit pivots toward the retraction position, and a pivot restricting member which performs pivot restriction of the swinging unit by moving to engage with the swinging unit in response to movement of the movable portion and releases the pivot restriction.

Advantageous Effects of Invention

According to the present invention, it is possible to implement a function required for a stop device by using an electric actuator which generates a driving force only in a single direction.

BRIEF DESCRIPTION OF THE DRAWINGS

FIG. 3A is a view for explaining the operation of the stop device 1;
FIG. 3B is a view for explaining the operation of the stop device 1;
FIG. 4A is a view for explaining the operation of the stop device 1;
FIG. 4B is a view for explaining the operation of the stop device 1.

DESCRIPTION OF THE EMBODIMENTS

Figure 1A:
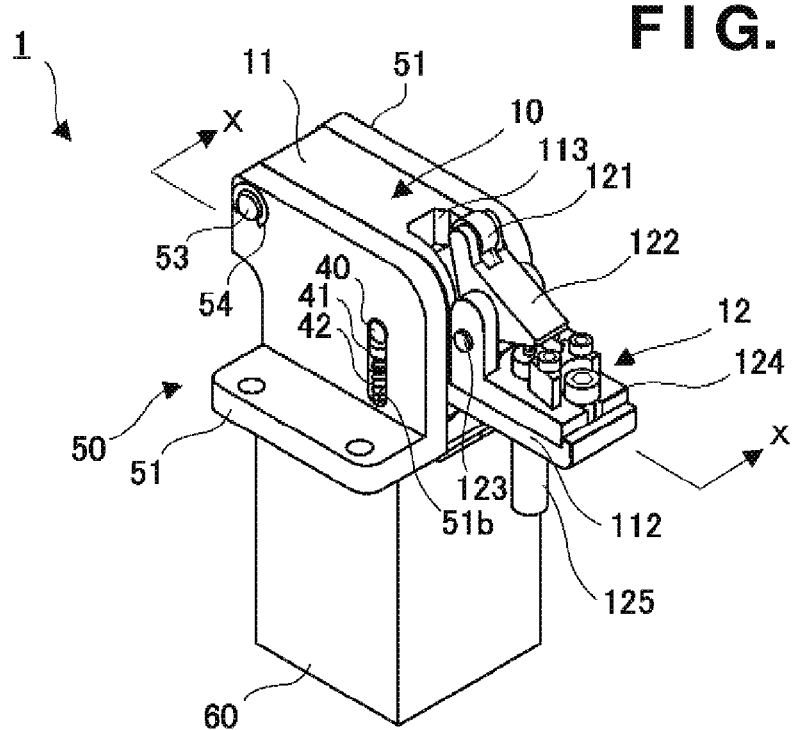
FIG. 1A is a perspective view of a stop device 1.
Figure 1B:
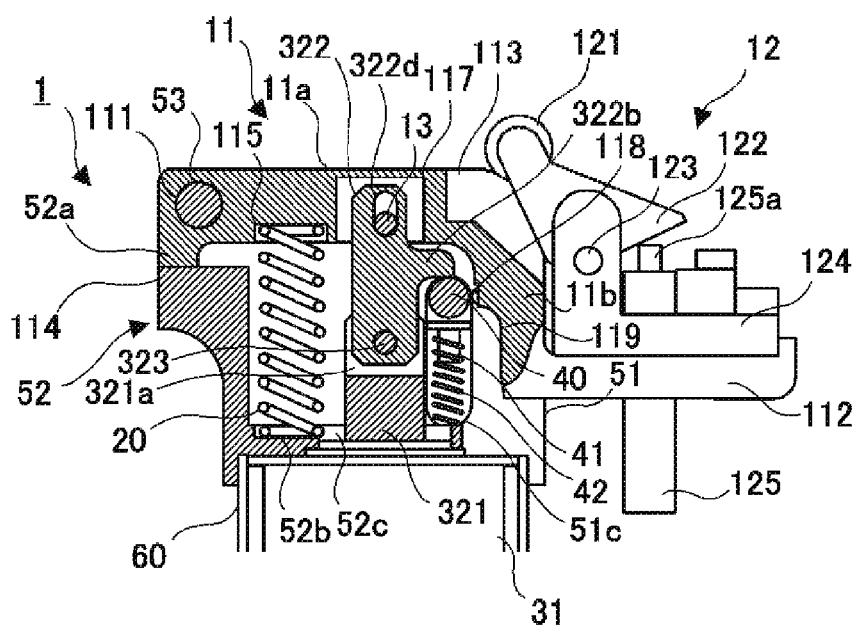
FIG. 1B is a sectional view taken along a line X-X in FIG. 1A.
Figure 2:
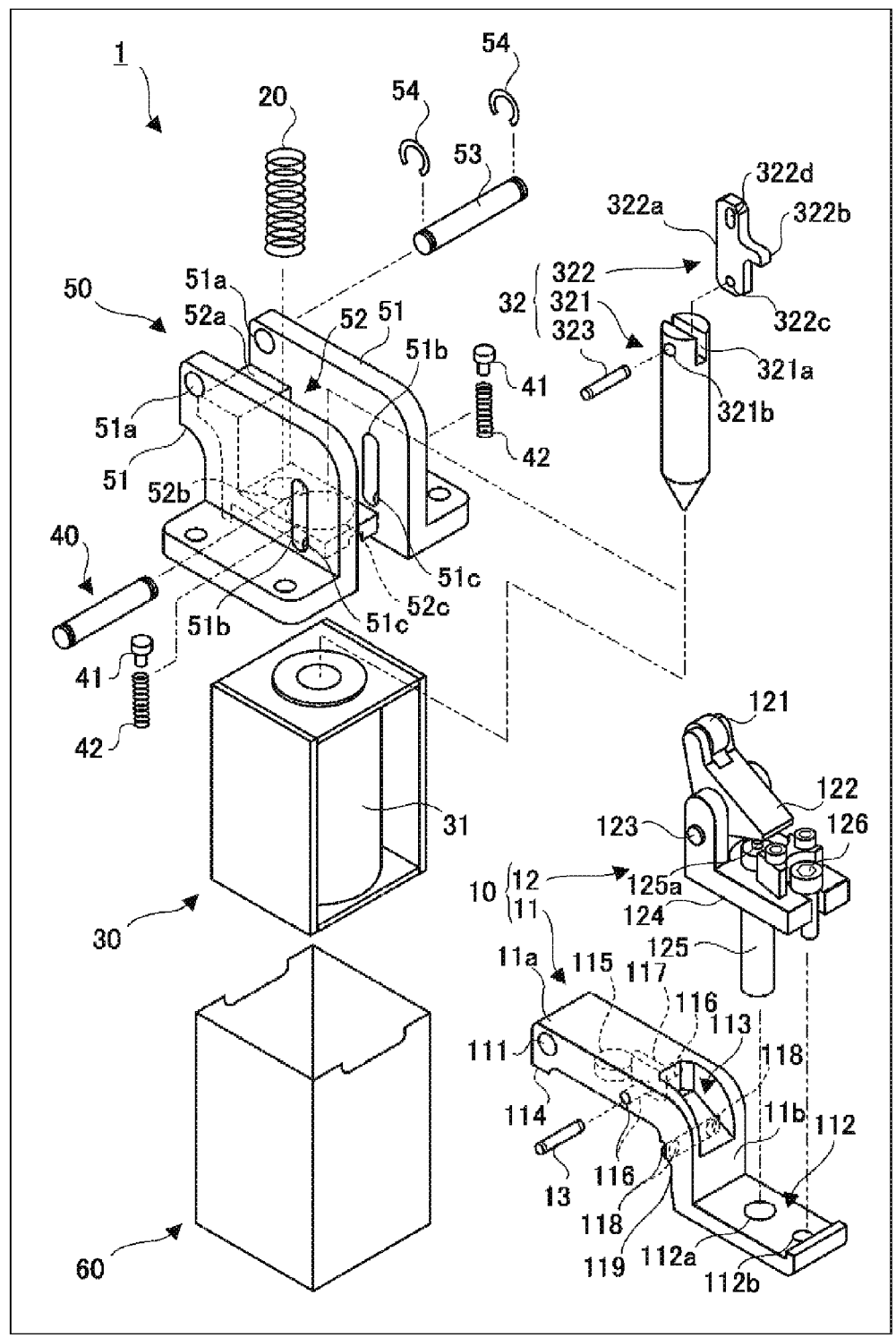
FIG. 2 is an exploded perspective view of the stop device 1.

A stop device 1 according to an embodiment of the present invention will be described with reference to FIGS. 1 and 2. FIG. 1A is a perspective view of the stop device 1. FIG. 1B is a sectional view taken along a line X-X in FIG. 1A. FIG. 2 is an exploded perspective view of the stop device 1. Note that FIG. 1B includes a sectional view of the main part of the stop device 1 and a partially sectional view of a swinging member 11.

The stop device 1 includes a swinging unit 10. The swinging unit 10 includes the swinging member 11 and an abutment unit 12. The swinging member 11 integrally includes an upper horizontal portion 11a which extends in the horizontal direction, an intermediate portion 11b which bends to extend from the upper horizontal portion 11a in the vertical direction, and a lower horizontal portion 112 which bends to extend from the intermediate portion 11b in the horizontal direction.

The swinging member 11 includes a shaft hole 111 in one end portion (an end portion of the upper horizontal portion 11a). A pivot shaft 53 is inserted into the shaft hole 111. The swinging member 11 is pivotal about the pivot shaft 53 as a pivot center. A projection portion 114 protrudes downward from an end portion of the upper horizontal portion 11a. The upper horizontal portion 11a has closed-end opening portions 115 and 117 which are open to their lower surfaces. The opening portion 115 is a spring receiving hole which has a circular cross-section and in which an elastic member 20 (described later) is mounted. The opening portion 117 is a hole which has an oblong cross-section and in which a coupling portion 322 (to be described later) is inserted. A pin insertion hole 116 is formed in a side surface portion of the upper horizontal portion 11a so as to extend through between the side surfaces. The pin insertion hole 116 communicates with the opening portion 117.

A notched portion 113 with a concave shape is formed in the bent portions of the upper horizontal portion 11a and intermediate portion 11b. The notched portion 113 is formed to avoid interference between a roller 121 of the abutment unit 12 (to be described later), a movable member 122, and the swinging member 11.

Two convex portions 118 each having a hemispherical shape are provided on an inner side surface (a surface continuous with the lower surface of the upper horizontal portion 11a) of the intermediate portion 11b. A notched portion (stepped portion) 119 is formed in a portion of the inner side surface of intermediate portion 11b, which is located below the convex portions 118, so as to extend to the lower horizontal portion 112. The abutment unit 12 is mounted on the lower horizontal portion 112. A through hole 112a extending through the lower horizontal portion 112 and a screw hole 112b are formed in the upper surface of the lower horizontal portion 112.

The abutment unit 12 includes the roller 121 as a workpiece abutment portion which abuts against a workpiece, the movable member 122 which rotatably supports the roller 121, and a support member 124 placed on the upper surface of the lower horizontal portion 112. The movable member 122 is supported on the support member 124 so as to be pivotal about a shaft 123. The cylinder portion (external cylindrical portion) of a shock absorber 125 extends through an insertion hole (not shown) formed through the upper and lower surfaces of the support member 124. The shock absorber 125 is fixed to the support member 124 with a rod portion 125a protruding from the upper surface of the support member 124. The lower surface of the rear end portion of the movable member 122 abuts against the distal end of the rod portion 125a of the shock absorber 125. A portion of the cylinder portion of the shock absorber 125 which protrudes from the lower surface of the support member 124 extends through the through hole 112a. The abutment unit 12 is fixed to the swinging member 11 by threadably engaging a bolt 126 with the screw hole 112b and fixing the support member 124 to the lower horizontal portion 112 of the swinging member 11.

The stop device 1 includes a support member 50. The support member 50 integrally includes a pair of L-shaped wall portions 51 and a coupling member 52 which couples the wall portions 51 to each other. The wall portions 51 respectively have bearing holes 51a which support the pivot shaft 53. The pivot shaft 53 sequentially extends through one bearing hole 51a, the shaft hole 111 of the swinging member 11, and the other bearing hole 51a. Retaining rings 54 engage with the two ends of the pivot shaft 53 to prevent dropping off of the pivot shaft 53 and assemble the swinging member 11 to the support member 50. The entire swinging unit 10 is supported on the support member 50 so as to be pivotal about the pivot shaft 53 as a pivot center.

The wall portions 51 respectively have grooves 51b through which a pivot restricting member 40 extends. Each groove 51b has an oblong shape extending in the vertical direction (parallel to the moving direction of a plunger 321 (to be described later)), and extends through the wall portion 51 in the thickness direction. The pivot restricting member 40 has a pin-like shape, which extends through the grooves 51b to be supported movably along the grooves 51b. Each groove 51b is provided with a receiving member 41 and an elastic member 42 which support the pivot restricting member 40 from below.

The receiving member 41 includes a large-diameter head portion and a small-diameter leg portion. The surface of the head portion abuts against the bottommost portion of the outer surface of the pivot restricting member 40, and the leg portion is inserted in the elastic member 42. A hole 51c is formed in the bottom portion of the groove 51b. When the receiving member 41 descends, the leg portion can enter the hole 51c. In this embodiment, the elastic member 42 is a compression spring (coil spring), which always biases the pivot restricting member 40 upward through the receiving member 41. This biasing force is smaller than that of the elastic member 20 (to be described later). Note that the elastic member 42 is not limited to a coil spring. It is possible to use another type of elastic member such as another type of compression spring including a leaf spring.

The connecting portion 52 has an almost L-shaped cross-section and a pivot restriction surface 52a on a horizontal upper-stage portion extending from the L-shaped upper portion. The pivot restriction surface 52a abuts against the projection portion 114 of the swinging member 11 to prevent the swinging unit 10 from pivoting counterclockwise from the state shown in FIG. 1B. A closed-end opening portion 52b and an insertion hole 52c as a through hole are formed in the lower-stage horizontal portion of the connecting portion 52. These holes partly overlap.

The opening portion 52b has a circular cross-section, which is a spring receiving hole in which the elastic member 20 is mounted. In this embodiment, the elastic member 20 is a compression spring (coil spring) coil spring and is mounted between the opening portion 115 of the swinging member 11 and the opening portion 52b of the connecting portion 52. The elastic member 20 always biases the swinging unit 10 upward to maintain the state shown in FIG. 1B. Note that the elastic member 20 is not limited to a coil spring. It is possible to use another type of elastic member such as another type of compression spring including a leaf spring.

The stop device 1 includes an electromotive drive unit 30 enclosed by a case 60. The electromotive drive unit 30 includes a driving portion 31 and a movable portion 32. The movable portion 32 includes a plunger 321, a coupling portion 322, and a coupling pin 323. In this embodiment, the driving portion 31 and the plunger 321 constitute a pull solenoid. Energizing the cylindrical driving portion 31 (electromagnet) will generate a driving force only in the direction in which the plunger 321 is pulled into the cylinder of the driving portion 31 (in the downward direction). That is, the pull solenoid generates no driving force in the direction in which the plunger 321 is pushed out from the cylinder of the driving portion 31 (in the upward direction).

The upper end portion of the plunger 321 is provided with a slit 321a in which part of the coupling portion 322 is inserted. A pin insertion hole 321b extending through the plunger 321 in the radial direction (perpendicular to the slit 321a) is formed in the outer surface of the upper end portion of the plunger 321. The coupling portion 322 is formed into an almost T shape from a main body portion 322a and an abutment portion 322b protruding laterally from a middle portion of the main body portion 322a. As shown in FIG. 1B, the lower surface of the abutment portion 322b abuts against the uppermost portion of the outer surface of the pivot restricting member 40. As a result, they engage with each other.

A circular coupling hole 322c through which the coupling pin 323 extends is formed in the lower portion of the main body portion 322a. When the coupling portion 322 is inserted into the slit 321a and the coupling pin 323 is inserted into the pin insertion hole 321b and the pin hole 322c to couple them to each other, the coupling portion 322 is coupled to the plunger 321 so as to be pivotal about the coupling pin 323 as a pivot center.

A coupling hole 322d through which a coupling pin 13 extends is formed in the upper portion of the main body portion 322a. The coupling hole 322d is an oblong hole which vertically extends. The upper portion of the coupling portion 322 is inserted into the opening portion 117 of the swinging member 11, and the coupling pin 13 is made to extend through the pin insertion hole 116 of the swinging member 11 and the coupling hole 322d, thereby coupling the coupling portion 322 to the swinging member 11. Since the coupling hole 322d is an oblong hole, the coupling between the coupling portion 322 and the swinging member 11 is fitting (loose fitting) with a predetermined play. Although the coupling hole 322d is an oblong hole in this embodiment, the shape may be other than an oblong shape (for example, a circular shape having a larger diameter than the coupling pin 13).

The operation of the stop device 1 having the above arrangement will be described next with reference to FIGS. 3 to 5. The stop device 1 is provided in a conveyance device such as a roller conveyor and used to temporarily stop a workpiece conveyed on the conveyance device. Referring to FIGS. 3 to 5, a chain double-dashed line L indicates a conveyance surface. The conveyance surface is at a position (height) at which a workpiece is placed and conveyed on the conveyance device (not shown).

FIG. 3A shows a state in which the device stops a workpiece W horizontally conveyed from left to right in FIG. 3A. The swinging unit 10 of the stop device 1 is located at an abutment position at which the roller 121 abuts against the workpiece W. At this abutment position, the roller 121 protrudes to a level higher than the lower surface of the workpiece W, that is, the conveyance surface L.

The elastic member 20 gives a biasing force to the swinging unit 10 in a direction to locate the swinging unit 10 at the abutment position (in the upward direction in FIG. 3A, that is, the counterclockwise direction centered on the pivot shaft 53 with the horizontal state of the swinging member 11 being the upper limit). Note that as described above, when the pivot restriction surface 52a of the connecting portion 52 abuts against the projection portion 114 of the swinging member 11, the swinging unit 10 does not further pivot counterclockwise from the state shown in FIG. 3A.

In the state shown in FIG. 3A, the electromotive drive unit 30 is in a non-driven state. The pivot restricting member 40 is located at the upper end of the groove 51c with the biasing force of the elastic member 42. In this embodiment, in the state shown in FIG. 3A, a slight gap S (about 0.1 mm to 0.3 mm) is formed between the pivot restricting member 40 and the convex portions 118 of the swinging member 11. The pivot restricting member 40 may engage with the convex portions 118 while they abut against each other. Note that the pivot restricting member 40 engages with the lower surface of the abutment portion 322b of the coupling portion 322 while they abut against each other.

Since the electromotive drive unit 30 is in the non-driven state, with the biasing force of the elastic member 42, the coupling portion 322 and the plunger 321 are pushed to the uppermost position through the pivot restricting member 40, and the coupling pin 13 is located at the lowermost portion of the coupling hole 322d. In this manner, the elastic member 42 gives a biasing force to the pivot restricting member 40 in a direction to engage it with the coupling portion 322.

FIG. 3B shows a state in which the workpiece W begins to abut against the roller 121. In this embodiment, the movable member 122 which supports the roller 121 is pivotal about the shaft 123 as a pivot center. For this reason, when the workpiece W begins to abut against the roller 121, the conveying force of the workpiece W does not act in a direction to make the entire swinging unit 10 pivot, and only the movable member 122 begins to pivot clockwise, as shown in FIG. 3B. Accompanying the pivoting of the movable member 122, the movable member 122 begins to abut against the distal end of the rod portion 125a of the shock absorber 125. The shock absorber 125 buffers the shock of the collision between the workpiece W and the roller 121.

In this embodiment, when the workpiece W is reversely conveyed from right to left in FIG. 3B, the collision between the roller 121 and the workpiece W makes the movable member 122 pivot counterclockwise to move the roller 121 and the movable member 122 into the notched portion 113 of the swinging member 11 so as not to protrude to a level higher than the conveyance surface L, thereby avoiding the interference of the reverse conveyance of the workpiece W.

When the workpiece W abuts against the roller 121 and the pivoting of the movable member 122 is complete, the conveying force of the workpiece W acts in a direction to make the swinging unit 10 pivot clockwise. At this time, in this embodiment, as shown in FIG. 3A, since there is the slight gap S between the pivot restricting member 40 and the convex portions 118 of the swinging member 11, the swinging unit 10 is allowed to pivot clockwise by an amount corresponding to the gap S, as shown in FIG. 4A. When the swinging unit 10 pivots, the pivot restricting member 40 abuts against the convex portions 118 of the swinging member 11 to be set in an engaged state, thereby restricting further pivoting of the swinging unit 10. Since the pivot restricting member 40 is supported on the support member 50 through the groove 51c, it is possible to restrict pivoting of the swinging unit 10 more reliably and firmly without using the driving force of the electromotive drive unit 30. Making the swinging unit 10 pivot by the amount corresponding to the gap S in this manner can receive the shock between the swinging unit 10 and the workpiece W through the pivot restricting member 40.

When the swinging unit 10 pivots by the amount corresponding to the gap S, the elastic member 20 is compressed by the corresponding amount. In this embodiment, the elasticity restoring force of the elastic member 20 is designed such that when the early stage of collision of the workpiece W, at which the shock of the collision is strong, ends, the pivoting force of the swinging member 11 based on the elasticity restoring force of the elastic member 20 becomes stronger than the pivoting force of the swinging member 11 based on the conveying force of the workpiece W. As shown in FIG. 4B, the swinging member 11 restores to the position shown in FIG. 3A. That is, the elastic member 20 can absorb the shock of the collision between the swinging unit 10 and workpiece W. The gag S is formed again between the pivot restricting member 40 and the convex portions 118 of the swinging member 11.

According to the above description, upon completion of pivoting of the movable member 122, the conveying force of the workpiece W acts in the direction to make the swinging unit 10 pivot clockwise. However, this device need not always operate in this sequence.

This embodiment can stop the workpiece W in this manner. In the embodiment, the swinging member 11 includes the upper horizontal portion 11a, the intermediate portion 11b, and the lower horizontal portion 112, and the abutment unit 12 is mounted on the lower horizontal portion 112. This arrangement is designed to reduce the difference in height in the vertical direction between the abutment position between the roller 121 and the workpiece W and the position of the pivot shaft 53. Reducing this difference will reduce the shock (force that makes the swinging unit 10 pivot clockwise) acting on the swinging unit 10 when the workpiece W abuts against the roller 121.

The following is a case in which driving the electromotive drive unit 30 will retract the roller 121 to a level lower than the lower surface of the workpiece W and make the swinging unit 10 pivot to a retraction position at which the workpiece W is not in contact with the roller 121, thereby allowing the workpiece W to pass through the stop device 1. In this embodiment, the driving portion 31 moves the plunger 321 in a direction to make the swinging unit 10 pivot toward the retraction position against the biasing force of the elastic member 20.

Figure 5A:
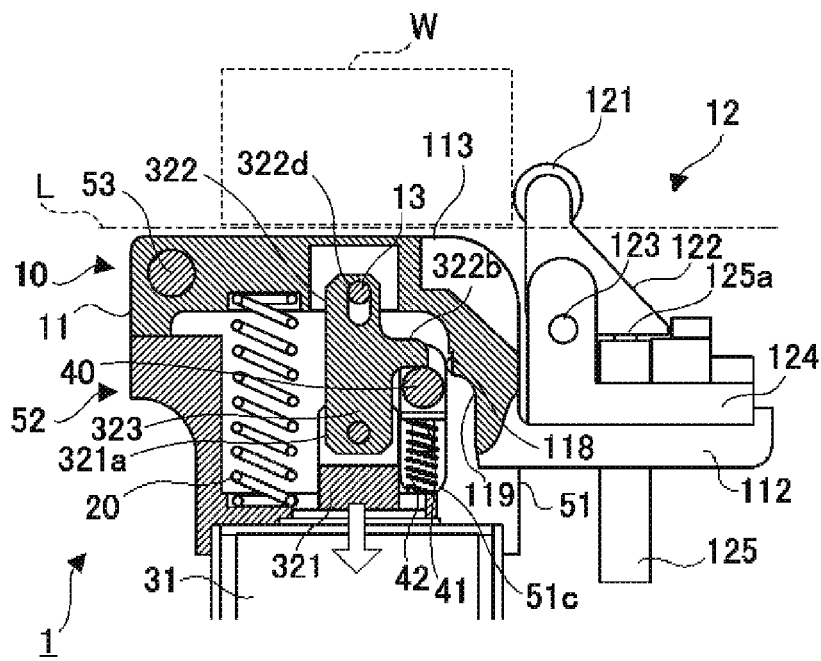
FIG. 5A is a view for explaining the operation of the stop device 1.

FIG. 5A shows an early state of the electromotive drive unit 30 which begins to be driven. In this state, the plunger 321 begins to move downward (begins to be pulled into the driving portion 31). Since the pivot restricting member 40 engages with the coupling portion 322, the pivot restricting member 40 begins to move downward in response to the movement of the plunger 321 and coupling portion 322. In this embodiment, since the gap S is formed between the pivot restricting member 40 and the convex portions 118 of the swinging member 11, the driving force that needs to be generated by the driving portion 31 can be smaller than that when the gap S is not formed.

That is, when the gap S is not formed, the pivoting force of the swinging member 11 based on the conveying force of the stopped workpiece W is transferred to the pivot restricting member 40 through the convex portions 118. This force becomes a load on the pivot restricting member 40. In this case, in order to move the pivot restricting member 40, it is necessary to use a larger force (equal to or larger than the sum of the pivoting force of the swinging member 11, the frictional resistance between the convex portions 118 and the pivot restricting member 40, and the frictional resistance between the pivot restricting member 40 and the grooves 51b). However, forming the gap S will eliminate the above frictional resistances, and the pivoting force of the swinging member 11 based on the conveying force of the workpiece W becomes a load on the elastic member 20. A smaller output (the difference between the pivoting force of the swinging member 11 and the biasing force of the elastic member 20) is sufficient as the driving force of the driving portion 31.

In general, the driving force of a solenoid is lower than that of an air cylinder, motor, or the like which has the same size. For this reason, in order to obtain the same driving force as that of an air cylinder, motor, or the like, it is necessary to use a solenoid larger than the air cylinder, motor, or the like. In this embodiment, as described above, since a smaller output is sufficient as the driving force of the driving portion 31, it is possible to avoid the device from becoming larger in size than a device using an air cylinder or motor.

Since the moving direction of the plunger 321 is parallel to the longitudinal direction of the groove 51, the pivot restricting member 40 moves in a direction parallel to the moving direction of the plunger 321. When the pivot restricting member 40 pivots downward by a predetermined amount, it becomes disengageable with the convex portions 118, as shown in FIG. 5A. The moving range of the pivot restricting member 40 up to the position at which it becomes disengageable with the convex portions 118 will be referred to as a restriction region, whereas a moving range after it becomes disengageable with the convex portions 118 will be referred to as a restriction release region. In the restriction region, the pivot restricting member 40 engages with the coupling portion 322. When the pivot restricting member 40 reaches the restriction release region, it does not engage with the movable portion 32 but engages with the notched portion 119.

Although the swinging unit 10 is coupled to the coupling portion 322, they are loosely fitted. For example, at the stage shown in FIG. 4B, although the bottom portion of the outer surface of the coupling pin 13 seats on the bottom portion of the coupling hole 322d, there is a gap (play) between the upper portion of the outer surface of the coupling pin 13 and the upper portion of the coupling hole 322d. For this reason, at the stage at which the plunger 321 begins to move downward (the stage between FIGS. 4B and 5A), the swinging unit 10 keeps disengaged with the coupling portion 322 until the upper portion of the outer surface of the coupling pin 13 seats on the upper portion of the coupling hole 322d. In this state, when the electromotive drive unit 30 gives no pivoting force to the swinging unit 10. When the plunger 321 moves downward by a predetermined amount, the upper portion of the outer surface of the coupling pin 13 seats on the upper portion of the coupling hole 322d, as shown in FIG. 5A. This couples the swinging unit 10 to the coupling portion 322, and the electromotive drive unit 30 gives a pivoting force to the swinging unit 10.

As described above, in this embodiment, the coupling portion 322 is coupled to the swinging unit 10 with a delay from the movement of the plunger 321 and pivot restricting member 40. Even if the electromotive drive unit 30 gives a pivoting force to the swinging unit 10 before the pivot restricting member 40 releases pivot restriction from the swinging unit 10, the force is wasted. The above arrangement will avoid this state. For this purpose, the length of the oblong hole of the coupling hole 322d is set to prevent the swinging unit 10 from being coupled to the coupling portion 322 before the pivot restricting member 40 moves outside the restriction region.

Figure 5B:
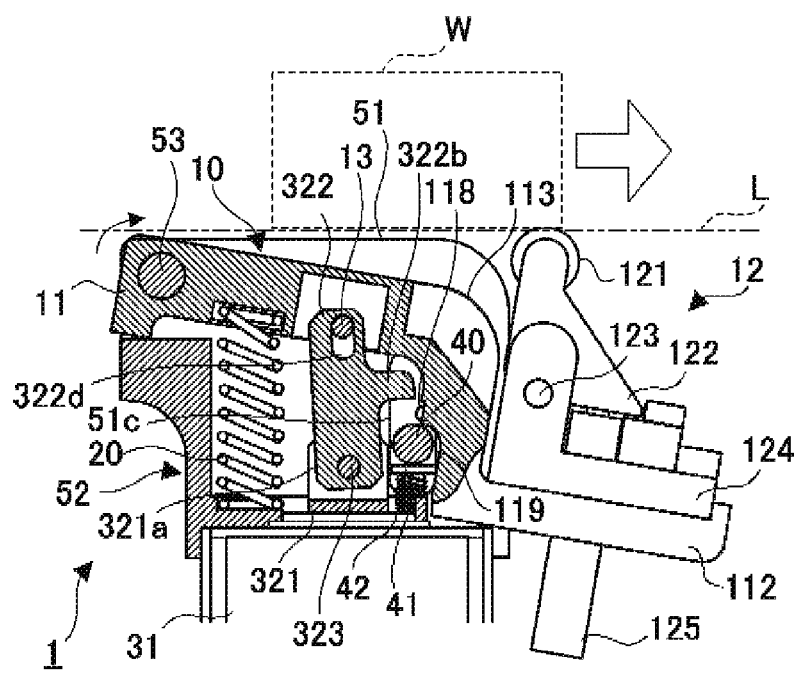
FIG. 5B is a view for explaining the operation of the stop device 1.

When the plunger 321 further moves downward while the swinging unit 10 is in a coupled state with the coupling portion 322 and the pivot restricting member 40 has moved into the restriction release region, the swinging unit 10 pivots clockwise against the biasing force of the elastic member 20, and the abutment unit 12 reaches the retraction position, as shown in FIG. 5B. The pivot restricting member 40 engages with the notched portion 119 while entering the notched portion 119 of the swinging member 11. In this state, pivot restriction of the swinging unit 10 is released to allow it pivot without any hindrance. In addition, in this embodiment, the position (coupling pin 13) at which the coupling portion 322 is coupled to the swinging unit 10 is provided at a position farther from the pivot shaft 53 than the point of action (opening portion 115) at which the elastic member 20 gives a biasing force to the swinging unit 10. This allows to use a unit with a lower output as the electromotive drive unit 30 owing to the principle of leverage than when the coupling pin 13 is provided closer to the pivot shaft 53 than the point of action.

When the electromotive drive unit 30 is set in the non-driven state from the state shown in FIG. 5B, the state shown in FIG. 4B is restored due to the restoring forces of the elastic member 20 and elastic member 42. When the electromotive drive unit 30 is set in the non-driven state while the roller 121 abuts against the bottom surface of the workpiece W whose conveyance has been resumed, the state shown in FIG. 3A is restored (the abutment unit 12 returns to the initial state) owing to the restoring forces of elastic member 20 and elastic member 42 after the workpiece W has passed.

As described above, in this embodiment, moving the pivot restricting member 40 in response to the movement of the movable portion 32 can prevent the swinging unit 10 from pivoting from the abutment position while using the electromotive drive unit 30 which generates a driving force only in a single direction (FIG. 4A) and move the swinging unit 10 to the retraction position (FIG. 5B), thereby implementing the function required for the stop device.

In addition, using the coupling portion 322 for the interlocked movement of the pivot restricting member 40 and movable portion 32 realizes a relatively simple arrangement. Although, in particular, the electromotive drive unit 30 may be a device other than a pull solenoid, the use of a pull solenoid allows to manufacture a device at a relatively low cost.

This application claims the benefit of Japanese Patent Application No. 2009-257542, filed Nov. 10, 2009, which is hereby incorporated by reference herein in its entirety.

What is claimed is:

1. A stop device which stops a workpiece being conveyed by abutting against the workpiece, comprising:
   a swinging unit which includes a workpiece abutment portion which stops the workpiece being conveyed by abutting against the workpiece, and is pivotal between an abutment position at which the workpiece abutment portion protrudes to a level higher than a lower surface of the workpiece and abuts against the workpiece and a retraction position at which the workpiece abutment portion retracts to a level lower than the lower surface of the workpiece and the workpiece is not in contact with the workpiece abutment portion;
   an elastic member for said swinging unit which gives a biasing force to said swinging unit in a direction to locate said swinging unit at the abutment position;
   an electromotive drive unit including a movable portion which is coupled to said swinging unit and a driving portion which moves the movable portion in a direction in which said swinging unit pivots toward the retraction position; and
   a pivot restricting member which performs pivot restriction of said swinging unit by moving to engage with said swinging unit in response to movement of the movable portion and releases the pivot restriction.

2. The stop device according to claim 1, wherein said pivot restricting member is provided to be movable in a range from a restriction region in which pivoting of said swinging unit is restricted to a restriction release region in which pivoting of said swinging unit is allowed.

3. The stop device according to claim 2, further comprising a support member which supports a pivot shaft of said swinging unit, wherein said pivot restricting member is supported so as to be movable along a groove provided in said support member.

4. The stop device according to claim 3, wherein said elastic member comprises a compression spring inserted in a compressed state between said swinging unit and said support member, and
   a coupling position between the movable portion and said swinging unit is set to make a distance between the pivot shaft and a position at which the movable portion is coupled to said swinging unit longer than a distance between the pivot shaft and a point of action at which the compression spring gives a biasing force to said swinging unit.

5. The stop device according to claim 1, wherein said electromotive drive unit comprises a pull solenoid including a plunger forming the movable portion.

6. The stop device according to claim 3, wherein said electromotive drive unit comprises a pull solenoid including a plunger forming the movable portion,
   said pivot restricting member is supported by said support member so as to be movable in a direction parallel to a moving direction of the plunger,
   the movable portion includes a coupling portion which couples the plunger to said swinging unit,
   said pivot restricting member comprises an engaging pin which engages with the coupling portion,
   the device comprises an elastic member for said pivot restricting member which gives a biasing force in a direction to engage the engaging pin with the coupling portion, and
   the coupling portion includes a main body portion coupled to the plunger and said swinging unit and a pivot restricting member abutment portion which is provided to protrude from the main body portion and abuts against the engaging pin.

7. The stop device according to claim 6, wherein the main body portion of the coupling portion is loosely fitted to said swinging unit such that when the driving portion of said electromotive drive unit moves the plunger, the main body portion is coupled to said swinging unit with a delay from movement of the coupling portion and the engaging pin.

* * * * *